United States Patent Office 3,205,129
Patented Sept. 7, 1965

3,205,129
SYNERGISTIC NEMATOCIDE
Clare B. Kenaga, Lake Geneva, Wis., and Raymond P. Seven, Wheaton, Ill., assignors, by mesne assignments, to Morton Salt Company, Chicago, Ill., a corporation of Delaware
No Drawing. Filed Sept. 1, 1959, Ser. No. 837,368
11 Claims. (Cl. 167—22)

This invention relates to nematocidal compositions and more particularly to synergistic nematocidal compositions containing 1,3-dichloropropene.

The use of 1,3-dichloropropene (also known and sold under the trade names Telone and DD) has heretofore been known and it is presently being used for the control of nematocidal infestations of certain agricultural crops such as sugar beets.

Similarly, certain isothiocyanates have also been used in the control of nematodes with variable results. One such material is allyl isothiocyanate (also known as mustard oil) which has been shown to be an effective nematocide in contact tests or when applied to nematode infestations in sandy soil conditions. However, it has been found that allyl isothiocyanate loses its effectiveness as a nematocide when applied to nematode infestations in an organic, loamy or muck soil habitat, to such an extent as to be considered substantially inactive.

It has been found, however, that the drawbacks inherent in use of allyl isothiocyanate and other isothiocyanates can be largely eliminated and minimized by the incorporation therewith of a 1,3-dichloropropene. It has also been found that the combination of isothiocyanates and dichloropropene results in a synergism, the resultant compositions having unexpectedly high activity as a nematocide and greater effectiveness than either compound used alone.

Accordingly, in one broad form the present invention comprises the provision of a synergistic nematocidal composition comprising an admixture of 1,3-dichloropropene and an alkyl, alkenyl, or cycloalkyl isothiocyanate.

Another aspect of the present invention is the provision of a process for controlling nematodes in loam soils which comprises applying to nematodes and their habitats a composition containing 1,3-dichloropropene and an isothiocyanate selected from the group consisting of alkyl isothiocyanates, alkenyl isothiocyanates and cycloalkyl isothiocyanates.

The alkyl and alkenyl isothiocyanates contemplated for use in the synergistic compositions of this invention are lower alkyl and alkenyl isothiocyanates preferably wherein said alkyl or alkenyl substituents contain up to about 6 carbon atoms. Exemplary of such substituents are groups such as methyl, ethyl, n-propyl, isopropyl, butyl, amyl, isoamyl, allyl, butenyl and the like. With respect to cycloalkyl derivatives, substituents containing up to 8 carbon atoms are contemplated such as for example cyclohexyl isothiocyanate and cyclopentyl isothiocyanate. Other organic cycloalkyl organic substituents such as methyl cyclopentyl, methyl cyclohexyl, dimethyl cyclohexyl and the like are also contemplated.

Broadly the proportions of each ingredient present in the synergistic composition are variable over a wide range. Preferred ranges of the isothiocyanate are from 5% to about 50% by weight and a most preferred range is from 10% to about 30% by weight.

The following procedure was utilized in evaluating the toxicity and effectiveness as a nematocide of the compositions of the present invention.

TEST PROCEDURE

The product to be tested is dissolved in N,N-dimethyl formamide in at least a 5% concentration. One end of a 5-inch glass tube, having a 1-inch I.D., is corked and the tube filled with about 57 grams of black loam soil, previously adjusted to a 20% moisture level and passed through a No. 12 sieve (U.S. Standard Sieve Series). The soil is gently and evenly compacted in the tube by tapping or the like. When compacted the soil column is 3⅜ to 3½ inches long. A one-fourth inch layer of dry sea sand is then added. Nematodes to be tested are removed from an oatmeal culture by means of the Baerman funnel technique using physiological saline, 0.85% NaCl, in place of distilled water. The concentration of nematodes should be between 12,000 to 15,000 nematodes per cc. with a volume of 35–50 ml. By means of a medicine dropper 4–6 drops of the nematode suspension (3000–5000 nematodes) are distributed evenly over the surface of the sand. An additional ¼-inch layer of dry sea sand is added to the tube and moistened with 1 ml. of physiological saline. A thin polyethylene film is placed over the open end of the tube and a cork pushed into the tube to the point of contact with the sand. The tube is then inverted and the first cork removed. A small depression is made in the soil with a glass rod. The solution to be tested is pipetted into the tube in the depression. The amount of compound to be tested is added in concentrations of 5000, 4000, 3000, 2000 $\mu$g. etc. After addition of the test compound the open end of the tube is covered with a thin film of polyethylene and recorked. All treatments are replicated three times. The tubes are left in the dark at 80° F. in an upright position (nematodes at the bottom of the tube) for 48 hours.

To determine the effectiveness of the compound, the sea sand containing the nematodes is removed from the tube and flushed with 10 ml. of physiological saline, and the saline solution decanted to a watch glass. The count on the check is carried out by noting the number of nematodes in the check required to give 100 live nematodes. The figure obtained is used as a basis of count in the counting of the treated nematodes. The following results were obtained using *Panagrellus redivivus* as the test nematode.

*Example I*

This example illustrates the synergistic effect of allyl isothiocyanate and 1,3-dichloropropene mixtures. Table A shows the results obtained using the allyl isothiocyanate and the 1,3-dichloropropene alone. Table B shows the results of the combined materials. The test procedure was described above. The dosage is given in micrograms ($\mu$g.) per tube in each test. The amount of synergism is shown in terms of increase in percent kill over the theoretical.

TABLE A.—NEMATOCIDAL ACTIVITY OF ALLYL ISOTHIOCYANATE AND 1,3-DICHLOROPROPENE

| Allyl isothiocyanate | | 1,3-dichloropropene | |
|---|---|---|---|
| Dosage in $\mu$g./tube | Percent kill | Dosage in $\mu$g./tube | Percent kill |
| 75 | 0 | 1,425 | 48 |
| 150 | 0 | 1,350 | 43 |
| 225 | 0 | 1,275 | 39 |
| 300 | 0 | 1,200 | 36 |
| 375 | 0 | 1,125 | 31 |
| 450 | 0 | 1,050 | 25 |
| 525 | 14 | 975 | 21 |

TABLE B.—ALLYL ISOTHIOCYANATE PLUS 1,3-DICHLOROPROPENE

| Allyl isothiocynanate, dosage in μg./tube | 1,3-dichloropropene, dosage in μg./tube | Percent allyl isothiocyanate in mixture w./w. | Theoretical percent kill of mixture based on additive effects | Percent actual kill | Amount of synergism |
|---|---|---|---|---|---|
| 75 | 1,425 | 5 | 48 | 59 | 11 |
| 150 | 1,350 | 10 | 43 | 58 | 15 |
| 225 | 1,275 | 15 | 39 | 53 | 14 |
| 300 | 1,200 | 20 | 36 | 67 | 31 |
| 375 | 1,125 | 25 | 31 | 75 | 44 |
| 450 | 1,050 | 30 | 25 | 62 | 37 |
| 525 | 975 | 35 | 35 | 54 | 19 |

The following examples show the synergistic effect of 1,3-dichloropropene and various isothiocyanates. The procedure was the same as that employed in Example I. In each instance Table A shows the results obtained at the given dosage of each compound alone, while Table B shows the effect of the combination.

*Example II*

TABLE A.—NEMATOCIDAL ACTIVITY OF CYCLOHEXYLISOTHIOCYANATE AND 1,3-DICHLOROPROPENE

| Cyclohexylisothiocyanate | | 1,3-dichloropropene | |
|---|---|---|---|
| Dosage in μg./tube | Percent kill | Dosage in μg./tube | Percent kill |
| 300 | 0 | 900 | 10 |
| 400 | 0 | 1,200 | 25 |
| 500 | 0 | 1,500 | 40 |

TABLE B.—CYCLOHEXYLISOTHIOCYANATE PLUS 1,3-DICHLOROPROPENE

| Cyclohexylisothiocyanate Dosage in μg./tube | 1,3-dichloropropene Dosage in μg./tube | Percent cyclohexylisothiocyanate in mixture w./w. | Theoretical percent kill of mixture based on additive effects | Percent actual kill | Amount of Synergism |
|---|---|---|---|---|---|
| 300 | 900 | 25 | 10 | 19 | 9 |
| 400 | 1,200 | 25 | 25 | 37 | 12 |
| 500 | 1,500 | 25 | 40 | 58 | 18 |

*Example III*

TABLE A.—NEMATOCIDAL ACTIVITY OF METHYL ISOTHIOCYANATE AND 1,3-DICHLOROPROPENE

| Methyl isothiocyanate | | 1,3-dichloropropene | |
|---|---|---|---|
| Dosage in μg./tube | Percent kill | Dosage in μg./tube | Percent kill |
| 50 | 0 | 450 | 0 |
| 75 | 5 | 425 | 0 |
| 100 | 25 | 400 | 0 |
| 125 | 51 | 375 | 0 |
| 150 | 87 | 350 | 0 |
| 175 | 95 | 325 | 0 |

TABLE B.—METHYL ISOTHIOCYANATE PLUS 1,3-DICHLOROPROPENE

| Methyl isothiocyanate Dosage in μg./tube | 1,3-dichloropropene Dosage in μg./tube | Percent methyl isothiocyanate in mixture w./w. | Theoretical percent kill of mixture based on additive effects | Percent actual kill | Amount of Synergism |
|---|---|---|---|---|---|
| 50 | 450 | 10 | 0 | 50 | 50 |
| 75 | 425 | 15 | 5 | 71 | 66 |
| 100 | 400 | 20 | 25 | 96 | 71 |
| 125 | 375 | 25 | 51 | 99 | 48 |
| 150 | 350 | 30 | 87 | 99 | 12 |
| 175 | 325 | 35 | 95 | 100 | <5 |

Example IV

TABLE A.—NEMATOCIDAL ACTIVITY OF n-BUTYL ISOTHIOCYANATE AND 1,3-DICHLOROPROPENE

| n-Butyl isothiocyanate | | 1,3-dichloropropene | |
|---|---|---|---|
| Dosage in μg./tube | Percent kill | Dosage in μg./tube | Percent kill |
| 300 | 0 | 900 | 10 |
| 400 | 0 | 1,200 | 25 |
| 500 | 6 | 1,500 | 40 |

TABLE B.—n-BUTYL ISOTHIOCYANATE PLUS 1,3-DICHLOROPROPENE

| n-Butyl isothiocyanate Dosage in μg./tube | 1,3-dichloropropene Dosage in μg./tube | Percent n-butyl isothiocyanate in mixture w./w. | Theoretical percent kill of mixture based on additive effects | Percent actual kill | Amount of Synergism |
|---|---|---|---|---|---|
| 300 | 900 | 25 | 10 | 23 | 13 |
| 400 | 1,200 | 25 | 25 | 53 | 28 |
| 500 | 1,500 | 25 | 46 | 90 | 44 |

It should be noted that the 1,3-dichloropropene utilized in the foregoing examples was a commercial product sold by the Shell Chemical Co. under the trade name DD containing about 90% 1,3-dichloropropene and about 10% of other related chlorinated hydrocarbons of which 1,2-dichloropropane is the major component.

While the foregoing compositions may readily be applied to loam soils in their undiluted form it is also true that they may be applied in conjunction with diluents or carriers which are inert or inactive to aid in the distribution of the active synergistic composition. For example, solvents, such as deodorized kerosene, ketones, esters, alcohols, chlorinated hydrocarbons and various low-boiling petroleum fractions, may be utilized in conjunction with the present synergistic compositions. In addition to organic solvent carriers of the type described above, the present nematocidal compositions may be applied in the form of emulsions, dispersions, or the like. The amount of material applied varies, of course, with the type of infestation and the character of the particular area to be treated, but application of the compositions at rates from about 2 to about 200 gallons per acre are satisfactory. In field tests on the control of *Heterodera schachtii* infestations in sugar beets, a composition containing 20 parts allyl isothiocyanate, 48 parts dichloropropene, and 32 parts 1,2-dichloropropane and related hydrocarbons applied at a rate of 8⅓ gallons per acre resulted in a yield of 7.09 tons of sugar beets per acre as compared with an untreated control area which yielded 3.92 tons of beets per acre.

While several embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:
1. A synergistic nematocidal composition of matter comprising an admixture of 1,3-dichloropropene and from 5 to 50 weight percent with respect to said dichloropropene component of an isothiocyanate selected from the group consisting of alkyl isothiocyanate, alkenyl isothiocyanate and cycloalkyl isothiocyanate, wherein said alkyl and alkenyl substituents contain up to 6 carbon atoms and said cycloalkyl substituent contains up to 8 carbon atoms.

2. The composition of claim 1 wherein the isothiocyanate is present in the admixture in an amount of from 10 to about 40 weight percent with respect to the dichloropropene component.

3. A synergistic nematocidal composition comprising an admixture containing 1,3-dichloropropene and from 5 to 50 weight percent methyl isothiocyanate.

4. A synergistic nematocidal composition comprising an admixture of 1,3-dichloropropene and from 5 to 50 weight percent allyl isothiocyanate.

5. A synergistic nematocidal composition comprising an admixture of 1,3-dichloropropene and from 5 to 50 weight percent butyl isothiocyanate.

6. A synergistic nematocidal composition comprising an admixture of 1,3-dichloropropene and from 5 to 50 weight percent cyclohexyl isothiocyanate.

7. A synergistic nematocidal composition comprising an admixture of 1,3-dichloropropene and from 5 to 50 weight percent of an isothiocyanate selected from the group consisting of alkyl, alkenyl, and cycloalkyl isothiocyanate wherein said alkyl and alkenyl substituents contain up to 6 carbon atoms and said cycloalkyl substituent contains up to 8 carbon atoms and a carrier therefor.

8. A process of controlling nematode infestations in loam soils which comprises applying to nematodes and their habitats in loam soils an admixture of 1,3-dichloropropene and from 5 to 50 weight percent of a compound selected from the group consisting of alkyl isothiocyanate, alkenyl isothiocyanate and cycloalkyl isothiocyanate wherein said alkyl and alkenyl substituents contain up to 6 carbon atoms and said cycloalkyl substituent contains up to 8 carbon atoms.

9. The process of claim 8 wherein the admixture is applied in conjunction with a carrier.

10. Method of controlling soil dwelling nematodes which comprises impregnating nematode infested soil with a nematocidal composition comprising an admixture of methyl isothiocyanate and 1,3-dichloropropene.

11. A synergistic nematocidal composition comprising an admixture of 1,3-dichloropropene and methyl isothiocyanate.

References Cited by the Examiner
UNITED STATES PATENTS 2,411,566  11/46  Evans ----------------- 167—13
2,865,803  12/58  Lewis ----------------- 167—13

OTHER REFERENCES

Chem. Abs. 47, 1845b (1953).
Parnell: British Jour. Pharmacol. (p. 519), vol. 7, pp. 509–533, 1952.

JULIAN S. LEVITT, *Primary Examiner.*
WILLIAM B. KNIGHT, MORRIS O. WOLK,
*Examiners.*

UNITED STATES PATENT OFFICE
CERTIFICATE OF CORRECTION

Patent No. 3,205,129 September 7, 1965

Clare B. Kenaga et al.

It is hereby certified that error appears in the above numbered patent requiring correction and that the said Letters Patent should read as corrected below.

Column 2, line 52, after "was" insert -- as --; column 5, line 48, for "200" read -- 100 --.

Signed and sealed this 12th day of April 1966.

(SEAL)
Attest:

ERNEST W. SWIDER
Attesting Officer

EDWARD J. BRENNER
Commissioner of Patents